United States Patent
Norris

(10) Patent No.: US 6,488,450 B2
(45) Date of Patent: Dec. 3, 2002

(54) T-SLOT MILLING CUTTER AND INSERT THEREFOR

(75) Inventor: David Norris, Rockford, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 13 days.

(21) Appl. No.: 09/767,174

(22) Filed: Jan. 22, 2001

(65) Prior Publication Data

US 2002/0098047 A1 Jul. 25, 2002

(51) Int. Cl.⁷ .............................. B23C 5/20; B26D 1/12
(52) U.S. Cl. .............................. 407/35; 407/43; 407/47; 407/53
(58) Field of Search .............................. 407/35, 42, 43, 407/47, 48, 49, 51, 52, 53, 54, 62, 65, 113, 114

(56) References Cited

U.S. PATENT DOCUMENTS

| | | | |
|---|---|---|---|
| 4,411,564 A | * | 10/1983 | Johnson ....................... 407/113 |
| 4,566,827 A | | 1/1986 | Neumueller |
| 4,618,296 A | | 10/1986 | Allaire et al. |
| 4,733,995 A | | 3/1988 | Aebi |
| 4,995,766 A | | 2/1991 | Coleman |
| 5,145,294 A | | 9/1992 | Flueckiger |
| 5,330,295 A | * | 7/1994 | Pawlik ........................ 407/42 |
| 5,348,426 A | | 9/1994 | Krupp |
| 5,536,119 A | | 7/1996 | Werner et al. |
| 5,597,268 A | | 1/1997 | Izumi |
| 5,924,824 A | | 7/1999 | Satran et al. |
| 6,196,769 B1 | * | 3/2001 | Satran et al. .................. 407/40 |
| 6,220,794 B1 | * | 4/2001 | Calamia et al. ............... 407/40 |
| 6,238,146 B1 | * | 5/2001 | Saltran et al. .............. 407/113 |

* cited by examiner

*Primary Examiner*—Henry Tsai
(74) *Attorney, Agent, or Firm*—Fitch, Even, Tabin & Flannery

(57) ABSTRACT

The T-slot milling cutter disclosed employs an indexable insert having two alternative edge surfaces which serve alternatively as the rake face and rear abutting face of the insert which transfers the cutting force to the rear wall of the insert pocket of the cutter. The alternative edge surfaces comprise three facets, once central to the surface and the other two receding from the central facet at equal angles thereto. They serve primarily to wedge the insert into mating angular surfaces in the rear wall of the insert pocket to secure the insert against dislodgement when held in the pocket by the customary attaching screw and, by their obliquity to the cutting direction, improve the cutting action when serving as the rake face.

6 Claims, 3 Drawing Sheets

T-SLOT MILLING CUTTER AND INSERT THEREFOR

This invention relates to milling cutters, and particularly to cutters for milling T-slots, and to indexable replaceable cutting inserts therefor.

BACKGROUND

T-Slot milling cutters having replaceable hard metal cutting inserts of the tangentially-mounted or "on edge" type, i.e., in which the rake face is an edge surface of the insert, as distinguished from radially-mounted or blade type inserts which present a major surface to the workpiece as a rake face, are subject to both axial and rotational dislodgement by the cutting force reaction.

It is the object of this invention to avoid that problem by so designing the locating edge surface of an insert for such application, and the mating surfaces of the insert pocket of the cutter, to prevent dislodgement of the insert while enhancing the cutting geometry of the mirror-image opposite edge surface of the indexable insert presented as the rake face thereof.

SUMMARY OF THE INVENTION

The opposite and alternative rake and positioning edge surfaces of the insert of the invention present a generally convex configuration as a result of being divided into three facets, a central facet which lies in a plane parallel to the rotational axis of the cutter body when mounted in rake position, and two flanking facets which recede diagonally and symmetrically from the central facet.

When serving as the rear locating surface of the insert, transferring the cutting force reaction to the body of the cutter, the flanking facets of the rearwardly facing edge of the insert are received as a wedge by mating angularly disposed facets of the rear wall of the insert pocket, the central facet of the insert edge surface being received within a depression in the rear wall of the pocket without engaging the boundaries thereof. The rotative position of the insert is thus determined entirely by the wedging engagement of the respective angularly-disposed flanking facets of the insert and the pocket.

When serving as the forwardly-facing rake face, the generally convex configuration of the three facets of the edge surface enhances the cutting action by introducing a further slashing element to that action.

DESCRIPTION OF THE DRAWINGS

The invention is described in reference to the accompanying drawings, in which.

DETAILED DESCRIPTION OF A PREFERRED EMBODIMENT

Figure 1:
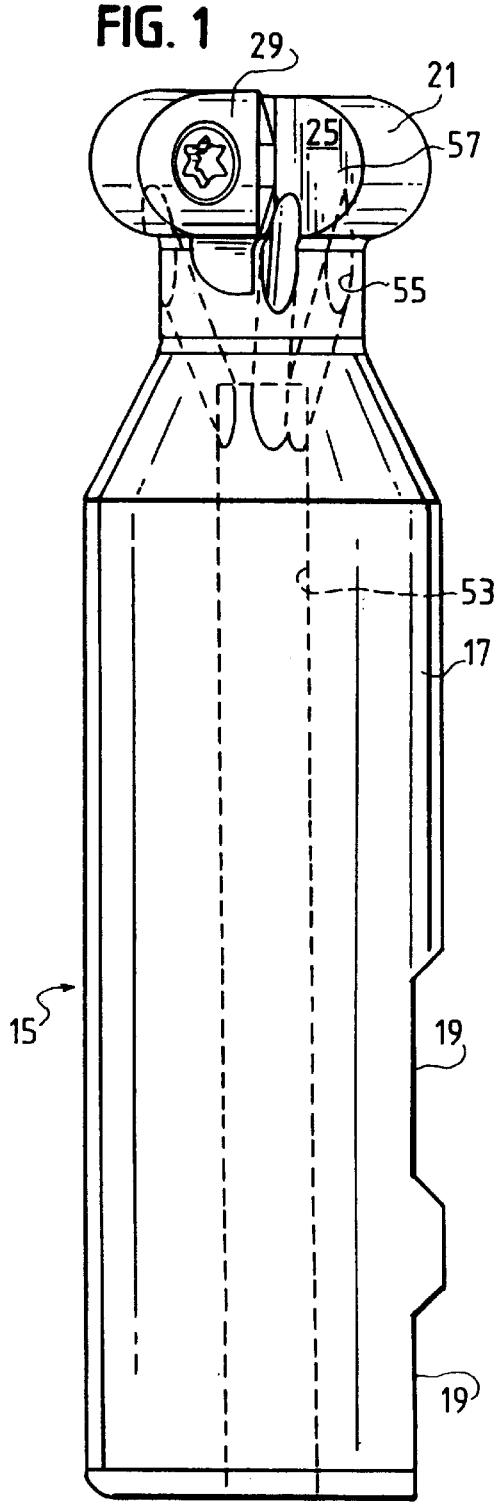
FIG. 1 is an elevational view of the T-slot miller of the invention.
Figure 2:
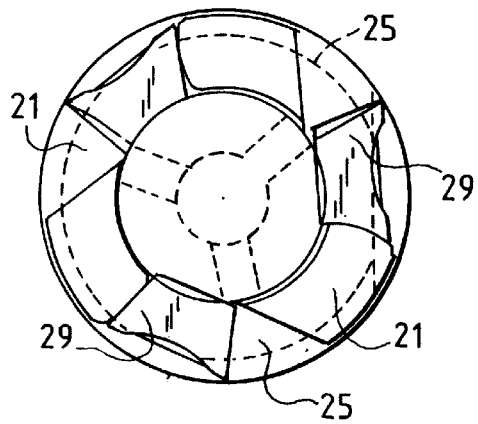
FIG. 2 is a top or end view of the cutting head of the tool.
Figure 4:
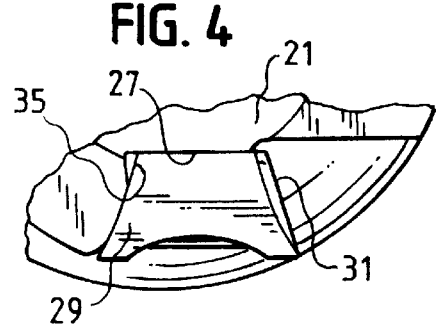
FIG. 4 is a fragmentary top view of the cutter head corresponding orthographically to FIG. 3.

In the T-slot milling cutter of the invention shown in FIG. 1, the majority of the length of the cutter body is taken by a gripping shank 17 having one or more flats 19 for rotary driving engagement by a tool holder. The shank is necked down at the free end of the cutter to define a cutter head 21 which is milled to provide three insert pockets 23 and chip gullets 25 in the illustrated case. The main seating surface 27 of the pocket is slightly offset from the parallel out-facing surface of the chip gullet, as best seen in FIG. 4.

Also in the illustrated embodiment, the profile of the cutter head 21 on a radial plane, and the slightly larger profile of the cutting path, are half-round, as the illustrated cutter was developed for machining retention slots for the gaskets of interfitting metal parts. The cutting path profile, half-round in this case, is however, irrelevant to the invention, which is applicable equally to T-slot millers of square or other profile.

Figure 3:
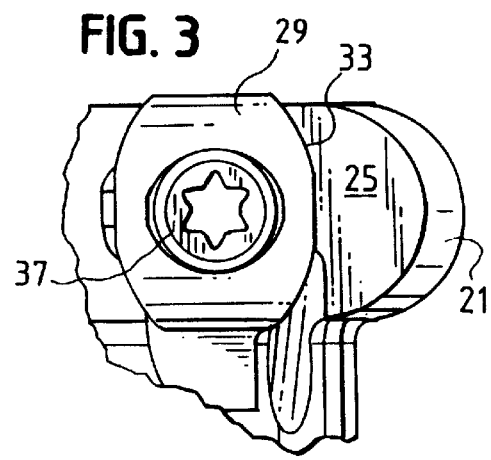
FIG. 3 is a fragmentary elevational view of the cutter head proper rotated slightly from its position in FIG. 1.

The cutting insert 29 is of the tangentially-mounted "on edge" type, in which one or more of the lesser edge surfaces constitute the rake face 31 and provide the cutting edges 33. In T-slot cutter service, the cutting edges 33 extend radially and axially beyond the profile of the cutter head itself, FIGS. 3 and 5, simultaneously milling all surfaces of the slot, i.e., all surfaces disposed radially and axially from the cutter head. In the illustrated case, radially and axially disposed cutting edges become merged in the half-round profiles noted.

The insert pocket 23 milled in the cutter head comprises the aforementioned flat tangential seating surface 27 terminating rearwardly, relative to cutting direction, in an upstanding ledge 35 (FIG. 6), which serves as an abutment for the cutting insert 29 to receive the thrust of the cutting force reaction. The insert 29 is secured in the pocket by a counter-sink headed screw 37 received in a countersunk through hole 38 in the insert 29 and a threaded hole 39 in the cutter head. The hole 39 in the cutter head is directed at a slight angle to the seating surface 27 to enable the conical head of the screw 37 to thrust the insert endwise against the abutment ledge 35 of the pocket, the engaging surfaces of which are an important feature of the invention.

Figure 6:
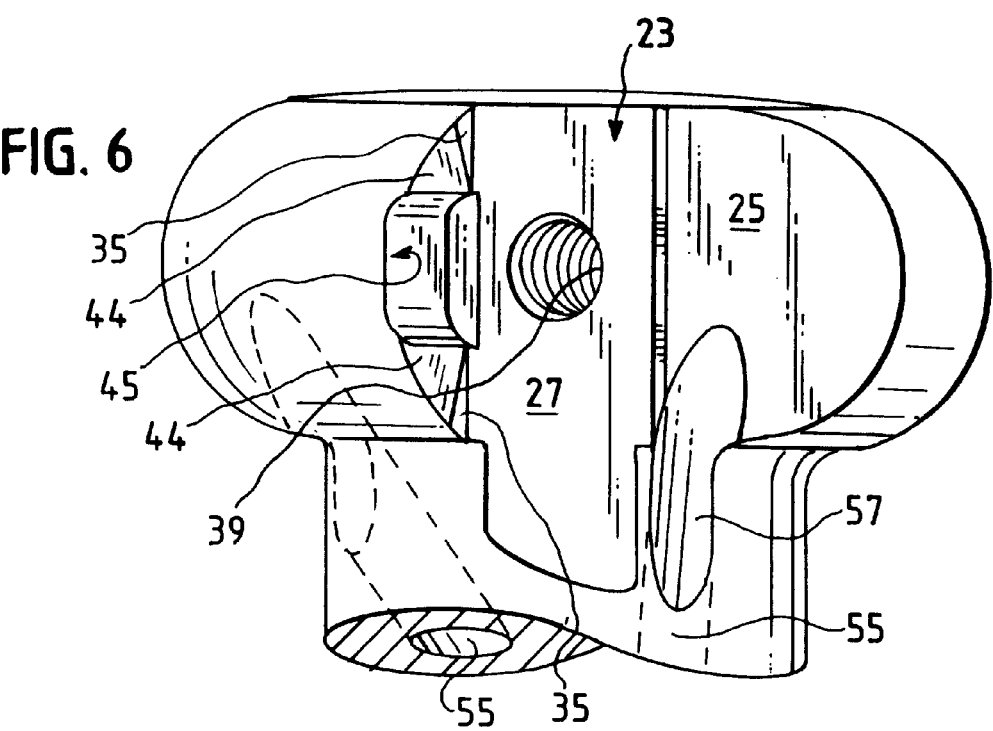
FIG. 6 is an enlarged fragmentary view corresponding to FIG. 5 and with the near side cutting insert removed to show the detail of the insert seat.

Referring to FIG. 6, it will be noted that the engaging surfaces 41 of the abutment are two, which are inclined to one another symmetrically about a radial plane and separated by a central depression 43. The inclination of the engaging surfaces 41 of the abutment matches that of two cooperating surfaces 45 of the cutting insert. Considered together, their symmetrical inclination with respect to a radial plane renders their engagement mutually wedging to resist cutting force reaction tending to rotate the insert about its securing fastener 37, a countersink-headed screw in the illustrated case. Their inclination with respect to an axial plane is determined by the requirements of the cutting geometry, and may therefore vary with the diameter of the cutter.

Figure 5:
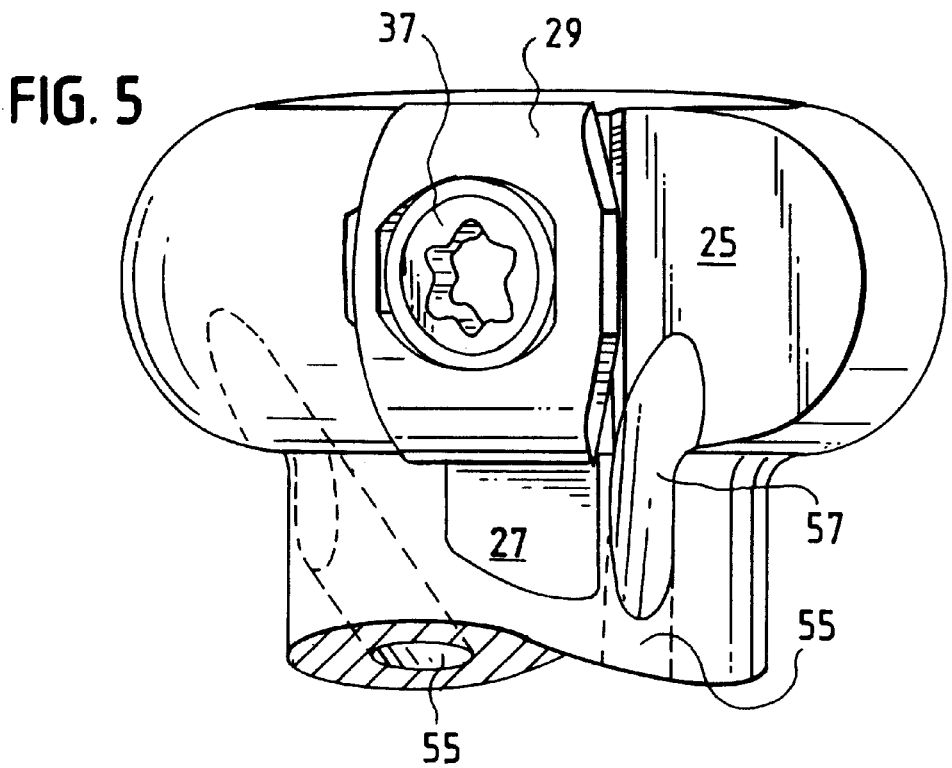
FIG. 5 is an enlarged fragmentary view of the cutter head showing the insert in place.
Figure 7:
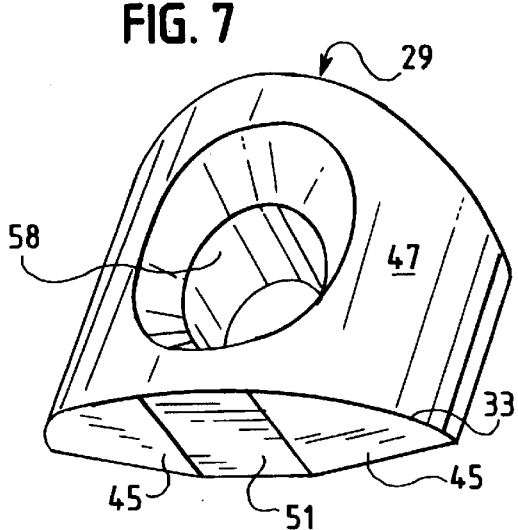
FIG. 7 is an enlarged perspective view of the cutting insert of the invention, removed from the cutting head.
Figure 11:
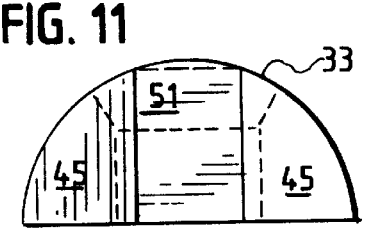
FIGS. 8, 9, 10, and 11 are orthographic projections of the cutting insert alone, displaying its several faces.
Figure 8:
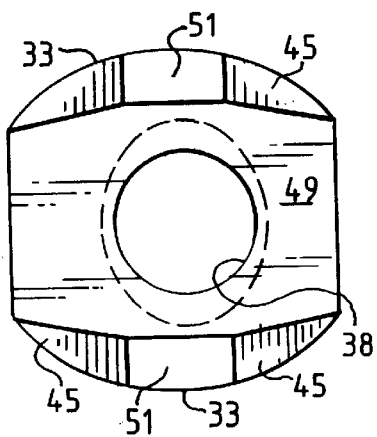

Being indexable to present two rake faces and cutting edges alternatively, the insert is bilaterally symmetrical about planes respectively parallel to the axis of the cutter body and perpendicular thereto, the latter to ensure the maintenance of the cutting profile in both indexable positions of the insert Referring to FIGS. 5 and 7, the top, or radially outward surface 47 of the insert is essentially cylindrical, but may be slightly elliptically ovate, if precisely half-round projection of the cutting profile is required. The bottom or radially inward, seating surface 49 of the insert is plane and oblong, differing from rectangular by the slight inclination of the abutment engaging surfaces 45 of the alternative faces, which intersect it (FIG. 8).

Figure 9:
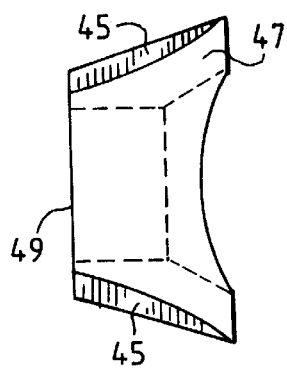
Figure 10:
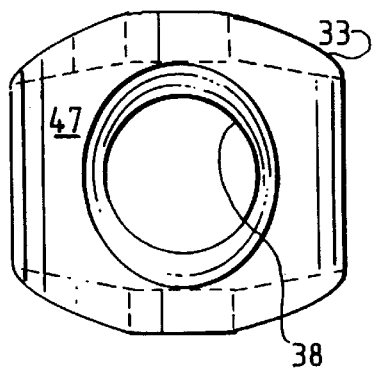

The opposing alternative rake faces diverge symmetrically from the seating surface 49 of the insert 29 at an angle determined by the cutting geometry, as before noted (FIG. 9). Each rake face is itself divided symmetrically into three facets, namely, a central facet 51 and the two flanking receding facets 45 of size equal to each other, which diverge from the central facet 51 at the same inclination as the engaging surfaces of the abutment ledge 35 of the insert pocket.

The fastener hole in the insert is precisely centered at the intersection of both axes of the symmetry so that the securing screw 37, while holding the insert against the seating surface 27 of the pocket, simultaneously urges the flanking surfaces 45 of the unused rake face into tight wedging engagement with the mating surfaces 41 of the abutment.

When so engaged, the insert is secure against cutting forces reactions tending to dislodge it, even as they may become unbalanced axially of the cutter head due to unequal wear, and tend to rotate the insert about its retaining fastener.

Considering the forwardly facing edge surface of the insert 29 employed as the rake face, its cutting edge 33 is curvilinear because of the curvature of the top or outer surface 47 of the insert, which constitutes the clearance face of the insert behind each of its edge surfaces serving as the rake face. When in cutting position, the three facets 45, 51, 45, of the rake face meet the workpiece at different angles to the direction of cutting movement, the central facet 51 meeting the workpiece squarely and the flanking facets 45 in a somewhat slashing cut. The symmetry of their angularity to the cutting direction, however, produces offsetting angular thrusts on the insert, with predominant rearward components which tend to drive the insert 29 more tightly into wedging engagement with the rear abutment surface 35 to maintain the insert securely in position despite the occurrence of differential wear along the cutting edge.

The independence of the cutter head from axial edge restraint of the tangentially-mounted cutting inserts permits the insert pocket and adjacent chip gullet to accommodate the insert in a shallower, less invasive pocket, which in turn permits the use of a larger number of inserts and smoother cutting action than would otherwise be feasible. The freedom of the disclosed inserts from the necessity of axial edge restraint by the cutter body is made possible by the wedging interengagement of the multifaceted rearwardly-facing one of its alternative rake faces with the abutment surfaces 41 at the rear of the insert pocket The shank 17 of the cutter body, it should be noted, is provided with an axial conduit 53 for cutting fluid, delivered under pressure from the machine spindle, the central conduit 53 dividing into three splayed lesser channels 55, each opening to a port 57 at the insert pocket in front of the rake face of the insert. The fluid delivered cools and lubricates the cutting site, and provides a flushing action to facilitate chip removal.

The features of the invention believed new and patentable are set forth in the following claims.

What is claimed is:

1. An indexable cutting insert for milling, comprising:
    a body of hard metal molded to provide an oblong plane seating surface, a pair of opposed surfaces rising symmetrically divergently from the long edges of said seating surface, a top surface opposed to said seating surface, and a through hole central to said oblong surface on an axis perpendicular thereto, said hole being countersunk from said top surface to receive a countersink head fastener;
    said opposed divergent surfaces each having a central plane facet flanked symmetrically by a pair of plane facets receding from said central facet;
    said opposed divergent surfaces constituting alternatively the rake surface and the rear seating surface of the insert when mounted in the body of a milling tool, said flanking receding facets of said divergent surfaces providing wedge-like engagement with conforming backing surfaces in a receiving insert pocket of the tool to secure the insert against dislodgment;
    said top surface providing a clearance face in both alternative indexable positions of the insert and providing the cutting edges of the insert at its intersections with said divergent surfaces.

2. The insert of claim 1 wherein said top surface is convex and said cutting edges are arcuately identical and intersect the oblong seating surface at the shorter end edges thereof.

3. The insert of claim 2 wherein said convex top surface is cylindrical and intersects said oblong seating surface in the shorter end edges of the latter.

4. An improved T-slot milling cutter having a gripping shank and a cutter head at one end of said shank, said cutter head having in its periphery at least one insert pocket adapted to receive therein a cutting insert secured in said pocket by a fastener passed through said insert radially of the cutter head and into a hole in the cutter head, wherein the improvement comprises:
    a rear wall of the pocket facing in the cutting direction of rotation of said cutter head and configured to conform to the oppositely-facing surface of a cutting insert, and a radially-outwardly facing bottom wall adjacent to said rear wall;
    said rear wall having axially-spaced divergent surfaces separated by a depression in said wall; and
    a cutting insert according to claim 1 secured in said pocket by a countersunk-headed fastener,
    the receding facets of one of said divergent surfaces of said insert being held by said fastener in facing contact with the divergent surfaces of said rear wall and the seating surface of said insert being held in facing contact with said bottom wall of said pocket, and
    the cutting edge of said insert extending radially and axially outwardly of the profile of said cutter head.

5. The improved T-slot milling cutter of claim 4, wherein the pockets in the cutter head are at least two in number and the insert is the insert of claim 2.

6. The improved T-slot milling cutter of claim 4, wherein the pockets in the cutter head are three in number and the insert is the insert of claim 1, wherein the top surface thereof is cylindrical and intersects the seating surface thereof in the short ends of the latter.

* * * * *